(No Model.)
J. A. BUCHANAN.
STRAW CUTTING ATTACHMENT FOR THRASHING MACHINES.
No. 327,064. Patented Sept. 29, 1885.
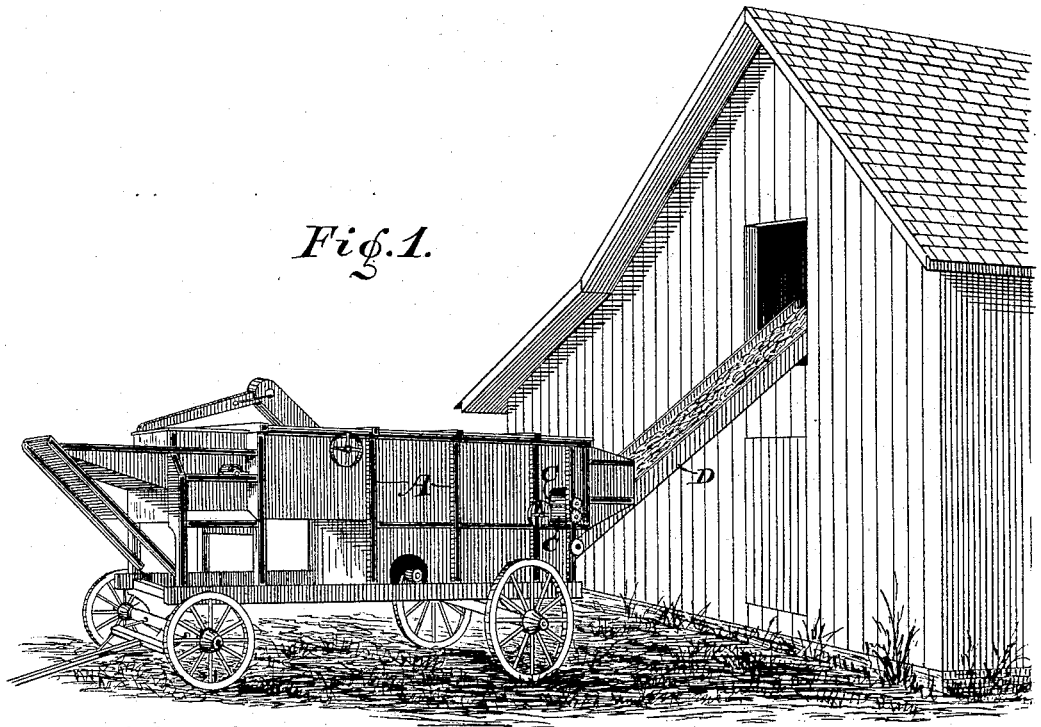
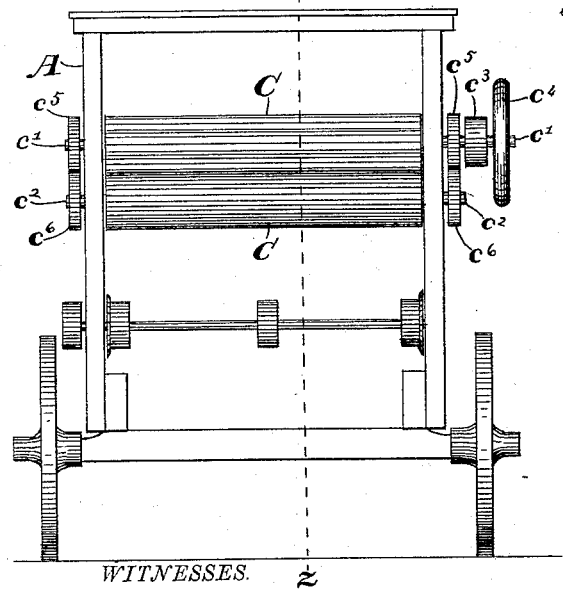
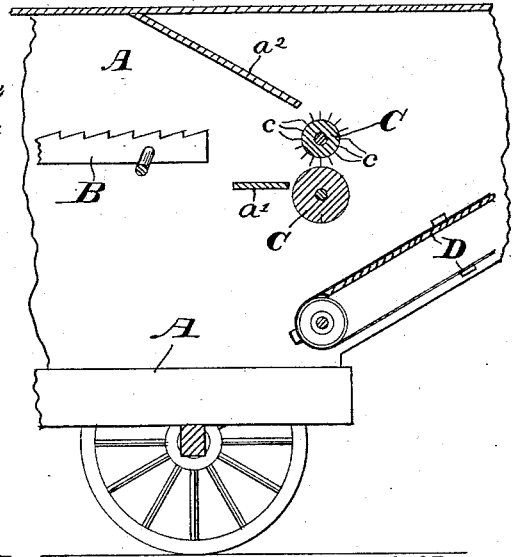
WITNESSES.
Chas. N. Leonard.
Chas. L. Thurber.
INVENTOR.
James A. Buchanan,
PER
C. Bradford,
ATTORNEY.

UNITED STATES PATENT OFFICE.

JAMES A. BUCHANAN, OF HUNTS CITY, ILLINOIS.

STRAW-CUTTING ATTACHMENT FOR THRASHING-MACHINES.

SPECIFICATION forming part of Letters Patent No. 327,064, dated September 29, 1885.

Application filed May 13, 1884. (No model.)

*To all whom it may concern:*

Be it known that I, JAMES A. BUCHANAN, of Hunts City, county of Jasper, and State of Illinois, have invented certain new and useful Improvements in Straw-Cutting Attachments for Thrashing-Machines, of which the following is a specification.

My said invention consists in the combination, with a thrashing-machine, of cutters arranged at the rear of the straw-carrier floor or apron, which will receive the straw as it leaves said floor and cut it into short pieces. Thus at the same time the grain is thrashed, and by the operation of the same machine producing cut straw or "chop."

Referring to the accompanying drawings, which are made a part hereof, and on which similar letters of reference indicate similar parts, Figure 1 is a perspective view of a thrashing-machine, a barn, and a straw-carrier running from said machine to a window in said barn, the design being to illustrate one of the most approved uses of my invention; Fig. 2, a rear elevation of a machine, showing the cutters in position, and Fig. 3 a vertical section on the dotted line $z\ z$, showing the cutter in cross-section and the relation of the rear end of the floor thereto.

In said drawings the portions marked A represent the frame-work and casing of the machine; B, the straw-carrier floor; C, the cutter, and D a straw-carrier for conveying the straw away from the machine.

As will be readily seen, the work of thrashing the grain and cutting the straw is, by the aid of my invention, a continuous operation, and is performed without the interposition of other machinery or power.

The cutter consists of two rolls, one or both of which have blades $c$, which come in contact with the periphery of the other roll. They are mounted on shafts $c'\ c^2$, and are arranged in the rear of the machine A in such relation to the floor B that when the straw leaves the latter it will pass between these cutting-rolls, and be cut into short pieces before leaving the machine. One of these shafts has a belt-pulley, $c^3$, by which, through a belt from any desired point on the machine, it is driven, and preferably a fly-wheel, $c^4$, for the usual purposes of a fly-wheel. It also has a spur-gear wheel, $c^5$, which engages with a like gear-wheel, $c^6$, on the other shaft, and thus secures a uniform movement for the other roll.

To guide the straw properly as it leaves the straw-carrier floor, wings $a'\ a^2$ are provided attached to the frame-work or casing A.

The operation of my said invention is as follows: The straw is carried along the floor B in the ordinary manner, and then, instead of being delivered directly onto the straw-carrier, passes between the cutters C, and is thereby transformed into chop, which may be used as "cut feed" for stock, or spread upon the ground to be plowed under as dressing. The drawings show the machinery arranged to carry it into the barn for the former purpose. For the latter it would be delivered instead into wagons or upon a stack for future disposition. The doing of this work at the same time the grain is thrashed, thus avoiding rehandling the straw, results in a great saving of time and labor and a more rapid accomplishment of the work. It would be very difficult, if not practically impossible, to spread the straw so evenly and in such good condition to be cut after it had been stacked, and it is obvious that a cutting-machine is capable of doing much more and better work when fed evenly and regularly.

Having thus fully described my said invention, what I claim as new, and desire to secure by Letters Patent, is—

1. The combination, with a thrashing-machine, of cutters arranged at the rear of the straw-carrier floor or apron to receive the straw as it comes from said floor and cut it before finally leaving said machine, substantially as set forth.

2. The combination, in a thrashing-machine, of the straw-carrier floor B and the cutters C, the latter being arranged at the rear end of the former and adapted to receive the straw therefrom and reduce it into chop, substantially as set forth.

3. The combination, in a thrashing-machine, of the frame-work having wings $a'\ a^2$, straw-carrier floor B, the cutters C, mounted on shafts $c'\ c^2$, provided with pulleys and gear-wheels $c^3\ c^5\ c^6$, substantially as shown and specified.

In witness whereof I have hereunto set my hand and seal, at Indianapolis, Indiana, this 9th day of May, A. D. 1884.

JAMES A. BUCHANAN. [L. S.]

In presence of—
C. BRADFORD,
CHAS. L. THURBER.